United States Patent [19]

Ludwig

[11] 4,119,004

[45] Oct. 10, 1978

[54] CUTTING BLADE

[76] Inventor: Clarence H. Ludwig, 816 W. Cherry St., Bluffton, Ind. 46714

[21] Appl. No.: 818,396

[22] Filed: Jul. 25, 1977

[51] Int. Cl.² ............................................. B26D 1/46
[52] U.S. Cl. ...................................... 83/661; 30/355; 83/853
[58] Field of Search ................ 83/661, 835, 697, 846, 83/847, 852, 853; 30/355, 346.56, 357; 76/89.1

[56] References Cited

U.S. PATENT DOCUMENTS

| | | | |
|---|---|---|---|
| 198,142 | 12/1877 | Morreau | 83/835 |
| 1,881,334 | 10/1932 | Treiber | 30/346.55 X |
| 2,596,851 | 5/1952 | Hansen | 83/846 |
| 2,825,968 | 3/1958 | Baer | 30/355 |

FOREIGN PATENT DOCUMENTS

| | | | |
|---|---|---|---|
| 359,798 | 10/1931 | United Kingdom | 30/357 |
| 592,234 | 9/1947 | United Kingdom | 83/661 |

*Primary Examiner*—N. P. Godici
*Attorney, Agent, or Firm*—John A. Young

[57] ABSTRACT

A slicing band consists of a base and an integral reduced cross section shank which is formed continuously throughout the length of the band. At the end of the shank is a scalloped cutting edge with inclined faces which intersect at the cutting edge of the scallops. The blade is constructed from an apparatus which utilizes two rotatable grinding wheels each with a flat annular grinding surface adapted to contact first one side of the blade and then the opposite side of the blade while the blade is yieldably retained against lateral movement and to effect material reduction to form the reduced cross section shank. The grinding wheel consists of cubic boron nitride, capable of performing material removal without burning or compromising the strength or other material requirements of the blade.

8 Claims, 14 Drawing Figures

U.S. Patent  Oct. 10, 1978  Sheet 1 of 6  4,119,004
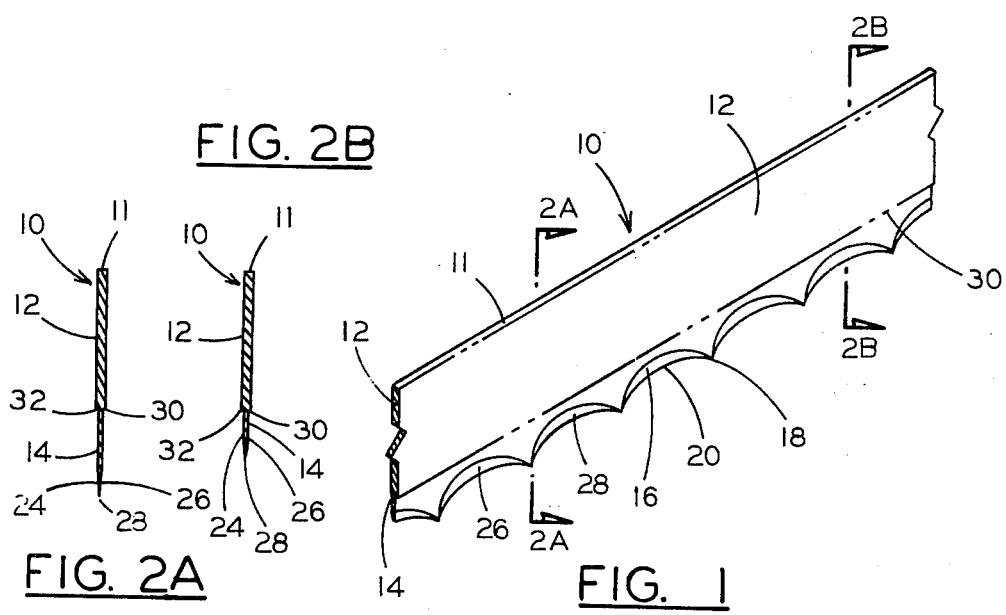
FIG. 2B
FIG. 2A
FIG. 1
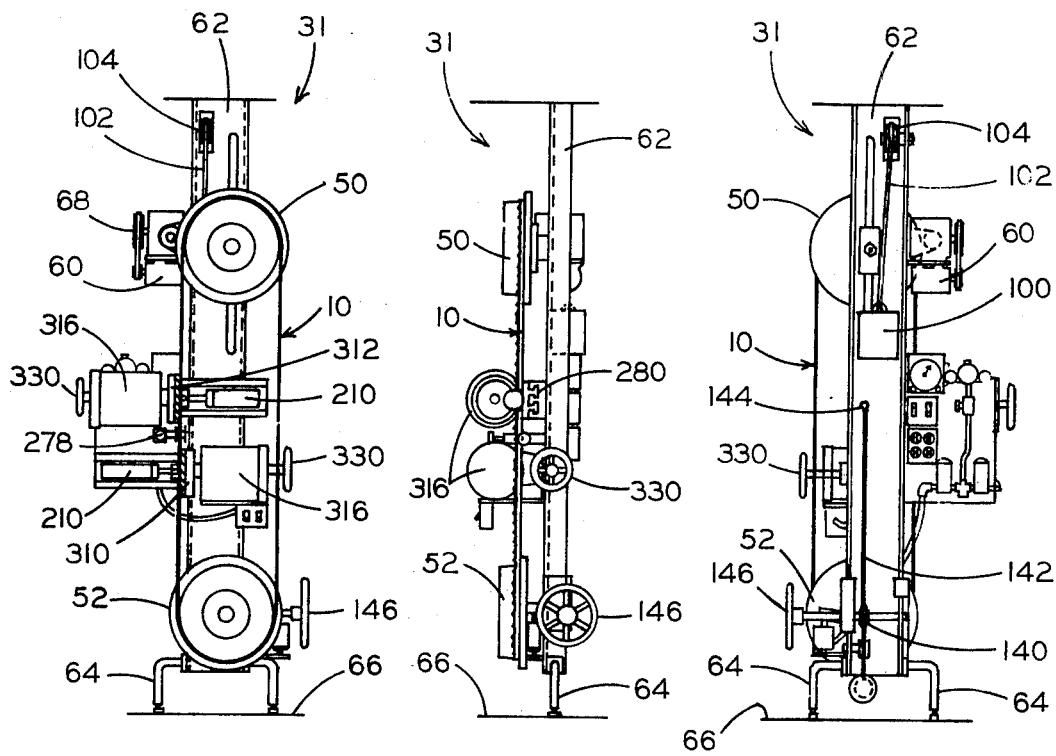
FIG. 3
FIG. 4
FIG. 5

CUTTING BLADE

BACKGROUND OF THE INVENTION

Cutting blades which are used for slicing bread consist of a thin cross section blade in the form of a band. The band is of steel composition and has a cutting edge formed on the band, generally in the form of scallops, and a profile or contoured cutting edge in which the sides of the blade are inclined and terminate at the cutting edge of the scallops. The requirement for the cutting blade is that it have durability which makes for a long wear life of the blade, and also have the further capacity of making a clean slice through the bread or other material being cut. These characteristics are difficult to attain. For example, a profile which is effective for making a clean slice is frequently incapable of retaining its cutting edge over a period of time and requires frequent honing; because of the material removal, it is then impossible to secure a reasonable wear life for the blade. In broadest terms, the requirement for a good blade is that it function efficiently and cleanly in its slicing action and at the same time be sufficiently durable so that it will not have to be discarded after a relatively short period of use.

It is known that the profile of the blade, i.e., its cross sectional configuration, has an effect on slicing value or slicing efficiency. At the same time, if the profile should contain structurally weak areas, then rapid dulling, and subsequent resharpening, results in accelerated material removal by so-called "honing" operations with the result that the blade has to be soon replaced. Many proposals have been made, some of which have answered the one problem of cleaner slicing action, others of which have answered the other problem of meeting the need of greater wear life. But the art has failed to produce a cutting blade to meet the requirements for clean slicing of bread and at the same time to achieve a material factor of improvement in the wear life.

What is the foremost object of the present invention is to produce a new profile of blade in which integrally related to the thin, flexible base, is a reduced cross section shank having shoulders at the intersection, or juncture, between the shank and the base. At the end of the shank is a continuously formed scallop which forms the cutting edge with the scallop cutting edge being formed from the opposite sides which taper toward each other and intersect at the cutting edge.

It is thought that the reason for the improved combination of greater wear life and cleanness of slice provided by this novel blade configuration is the relief which is provided between the cutting edge and the base. Thus, as the cutting edge passes into the bread it is followed not by a relatively thicker cross section base, but by a relatively thin cross section shank which tends to hold the cutting edge against bending out of the cutting plane, and precluding tearing, as distinguished from clean slicing, and adding to the friction which can contribute to the wear rate. Therefore, it can be seen from the blade configuration itself that what might very well account for this combination of improvements is the manner in which the blade is successively stepped first from the cutting edge then through the inclined honed section of the cutting edge to the narrow cross section shank and then to the larger cross section base.

While these are advanced as possible reasons accounting for the improved results, the explanation is theoretical, and, whether correct or not, the structure itself is inherently an improvement in combining the features of greater wear life and cleaner slicing action.

Another object of the present invention is to employ a new process and apparatus, which entails new grinding techniques for material removal in a continuous manner and without encountering such high degrees of heat and abrasion as will in any way temper or moderate the strength of the steel composition of the blade. To accomplish this, there are utilized two grinding wheels which employ flat annular grinding surfaces, one wheel bearing against one side of the blade and the other wheel bearing against the opposite side of the blade to produce the material reduction and form the intermediate shank of narrow cross section. Generally, this step is performed after the scalloping-and-edge cutting is performed on the blade so that the blade is passed continuously between the two grinding wheels where the final material removal is effected, which configures the shank. The grinding wheels are comprised of cubic boron nitride of special composition known as "Borazon CBM" (a trademark for material obtained from General Electric and formed into a borazon wheel by the Norton Company, Form 3509 2P-PXM-4-74).

In the present invention, it is an important object to provide an apparatus and process by which the cutting blade passes continuously between slideable gripping means which hold the blade at its correct position in relation to these grinding wheels with a two-stage grinding wherein grinding occurs first on one side and then the opposite side of the blade to produce the final configuration.

Another object of the present invention is to employ a new and novel apparatus which is adaptable for different hoop length blades and capable of retaining such blades under preferred tension effecting their continuous, or endless, rotation so that as the blades rotate they are both ground and yieldably gripped so as to be positioned at a preferred angle during the grinding operation. The result is a particular profiled blade having a requisite depth, cross section, inclined sides, and cutting edge ideal for a given cutting operation.

A further object of the present invention is to provide an apparatus which can be both manually controlled and timer controlled so that either a predetermined period of grinding action can be imposed on the machine and at the end of such machine operation the blade will be completely ground and the given profile edge formed thereon, or the operation can be extended or cut short.

Another object of the present invention is to provide a grinding apparatus and process which is capable of employing the relatively new but as yet nonextensively used cubic boron nitride composition grinding wheel which acts as a superabrasive. In spite of the greater expense of this material, it is capable, when employed in the present process and apparatus, of producing a grinding action on a blade and producing the blade with an acceptable wear life such that blades can be produced at a competitive cost even though the grinding wheels are very expensive.

An important feature of the present invention is that during the grinding operation the positioning of the blade and retention of the blade are precisely obtainable in relation to the grinding wheel so that an exact profile for the cutting edge is obtainable notwithstanding slight variations in dimension of the width of the blade. Thus, the blade is mountable on the apparatus, the grinding operation can be commenced, and will continue for a prescribed period of time at the end of which the blade is fully ground and the exact profile is imposed on the blade, this in spite of the fact that there are inevitably various dimensional variations in the thickness of the blade. Moreover, the apparatus is equipped with manual override means so that the grinding operation can be either intermittent, discontinued, stopped and recommenced in the middle of a grinding cycle. The blades are easily installed, tensioned, ground, and then replaced with the aid of power means in order to obtain the greatest blade production.

Adjustments in positioning of the grinding wheel and blade during grinding are all contemplated to be, and in fact are, relatively easy adjustments, and they are micrometric to obtain a fine degree of variation in blade profile to achieve the exact results.

Other objects and features of the present invention will become apparent from a consideration of the following description, which proceeds with reference to the accompanying drawings wherein certain selected example embodiments of the invention are illustrated by way of example and not by way of limitation.

DRAWINGS

FIG. 1 is a fragmentary detailed view of the cutting, or slicing, band, shown partially in cross section and illustrating the profile of the cutting edge;

FIGS. 2A and 2B are section views taken on lines 2A—2A and 2B—2B of FIG. 1 and illustrating the cross sectional portions of the slicing band;

FIG. 3 illustrates in front elevation the apparatus for grinding the slicing band and forming the unique profile illustrated in FIGS. 1, 2A, and 2B;

FIG. 4 is a side elevation view of the apparatus in FIG. 3 viewed from the right-hand side thereof;

FIG. 5 is a rear elevation of the apparatus shown in FIG. 3 viewed from the right-hand side of FIG. 4;

Figure 12:
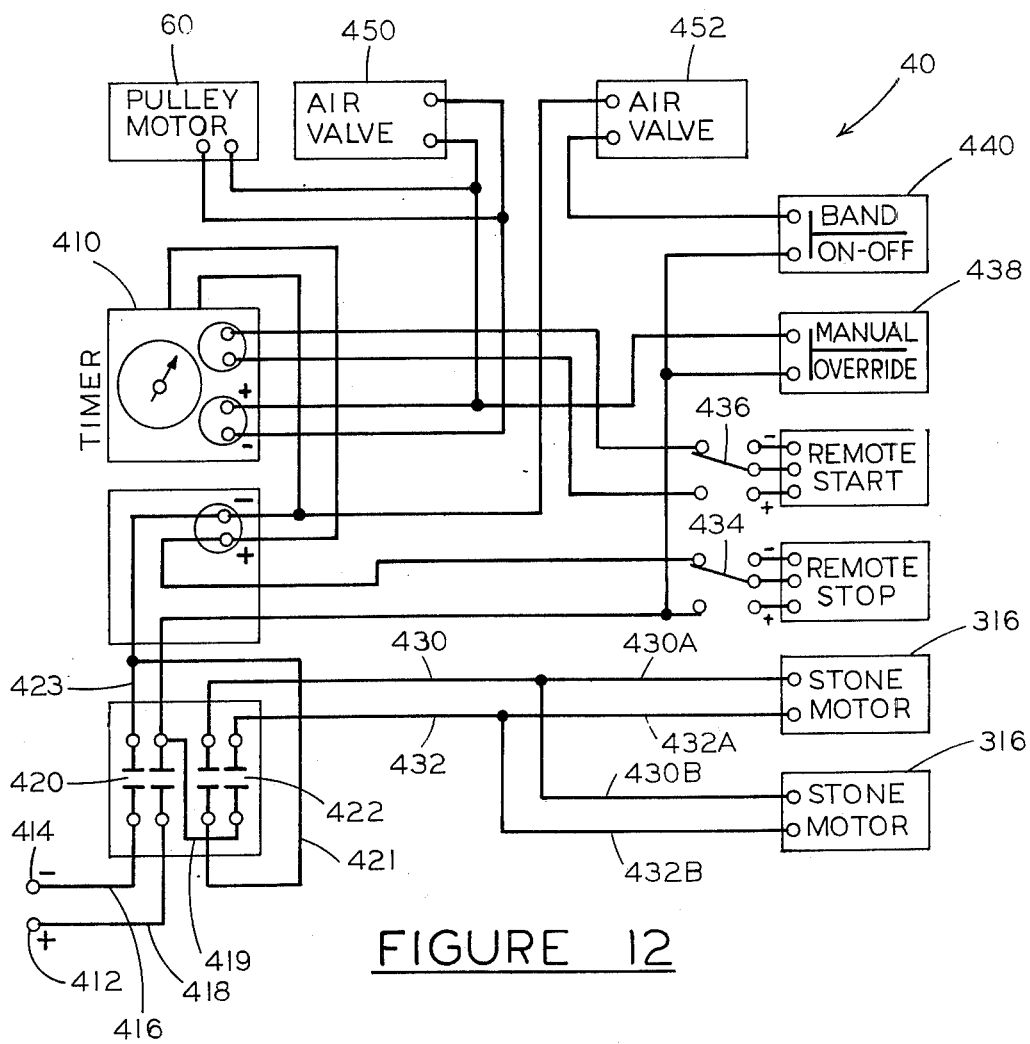
Figure 13:
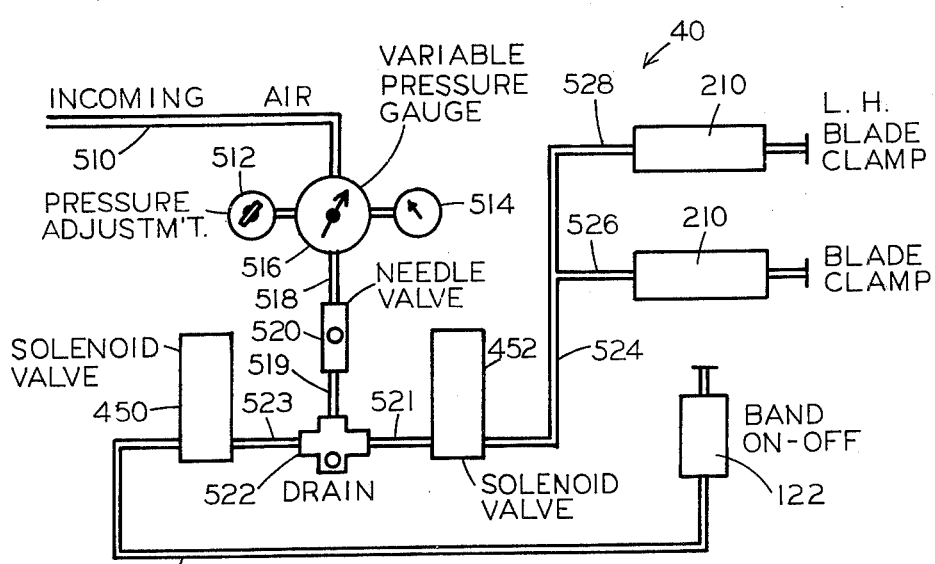

FIG. 12 is a circuit diagram illustrating the controls, including the timer, for the air valve and pulley motor by which the apparatus can be made to run semi-continuously for a given cycle of complete grinding operation or the operation can be interrupted and controlled manually by switching means; and, FIG. 13 is a schematic view illustrating the combination of air, solenoid valve operation for controlling the on-off clamping means for the blade, and for the clamping of the blade itself.

DETAILED DESCRIPTION OF THE INVENTION

Referring now to the drawings, and particularly FIGS. 1-5, the process and apparatus illustrated are used for grinding a preferred cutting edge on a cutting blade designated generally by reference numeral 10.

The blade, or band 10 consists of a slicing band which is elongated and of relatively thin cross section and has a cutting edge profile along one side thereof.

Referring to FIGS. 1, 2A and 2B, band 10 consists of a base 12 having a base edge 11, a shank 14, and a cutting edge consisting of a series of scallops 16 including points, or crests, 18, and valleys 20. The scallops have beveled sides 24,26, which intersect at cutting edge 28.

An important feature of the present invention is the unique profile of this blade. Initially, the blade or band 10 is configured with the scallops and beveled edges and the present invention then forms the shank 14 by a material reduction through grinding operations distinctly performed first at one side 30, and then at the other side 32 of the blade. The material removed forms the shank 14, but the amount of material removal in no way changes the basic configuration of the scalloped and beveled edges. The combination of scallops 16 and beveled sides 24,26 and shank 14 permit the blade 10 in operation to perform a cleaner slicing action and reduced wear, thus obviating the requirement for extensive honings. The friction of the blade 10 as it passes through bread or other material is greatly relieved by reason of the shank 14, and that is why the cutting edge will retain its keenness over a longer period.

How the grinding is accomplished will next be described in connection with the pertinent part of the apparatus.

Figure 6:
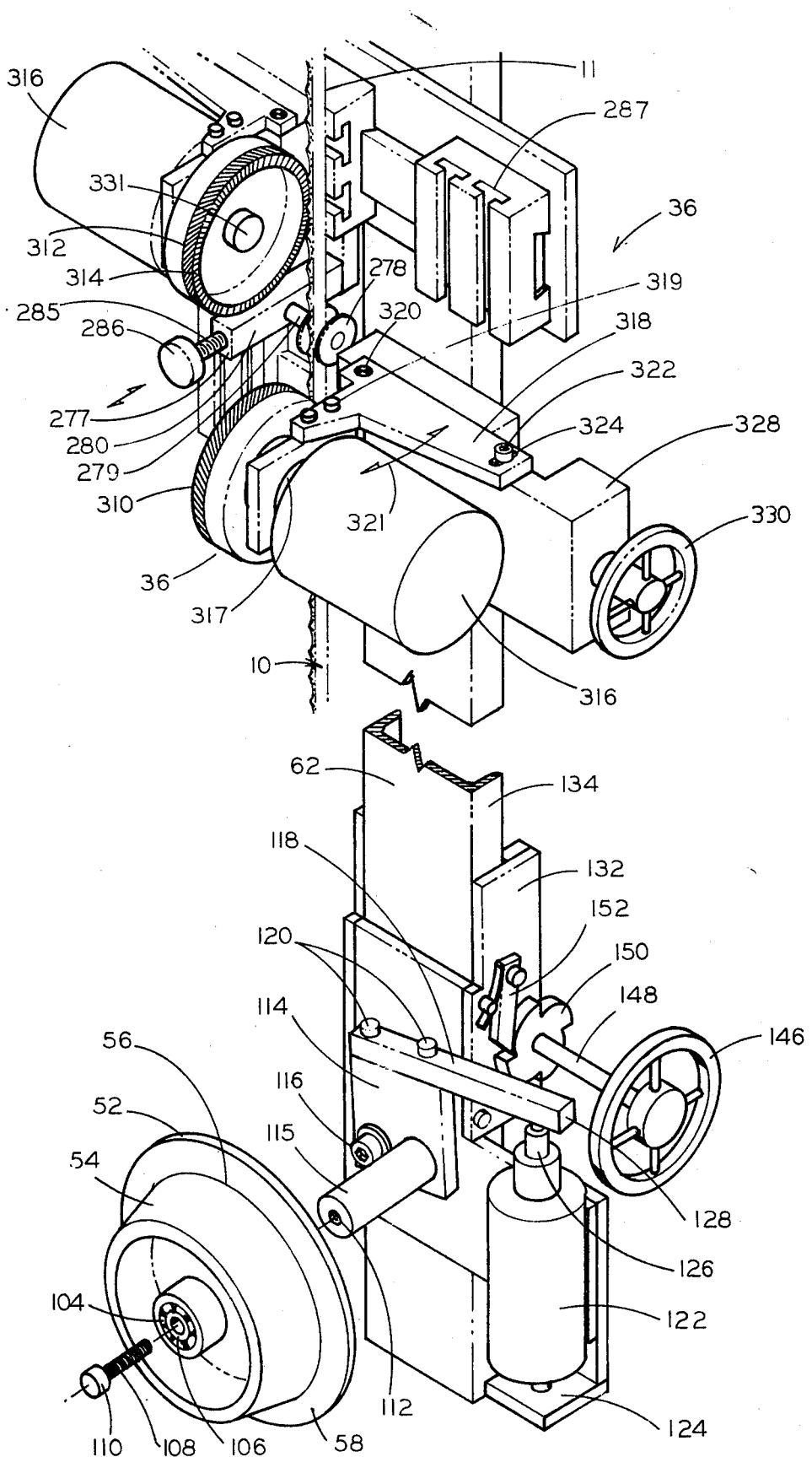
FIG. 6 is an isometric detail view showing in enlarged form the apparatus partially exploded and consisting of the lower part of the clamping and rotating means for effecting continuous rotational movement of the blade; the upper part of FIG. 6 illustrates in isometric form the grinding wheels and clamping mechanism for the blade.
Figure 7:
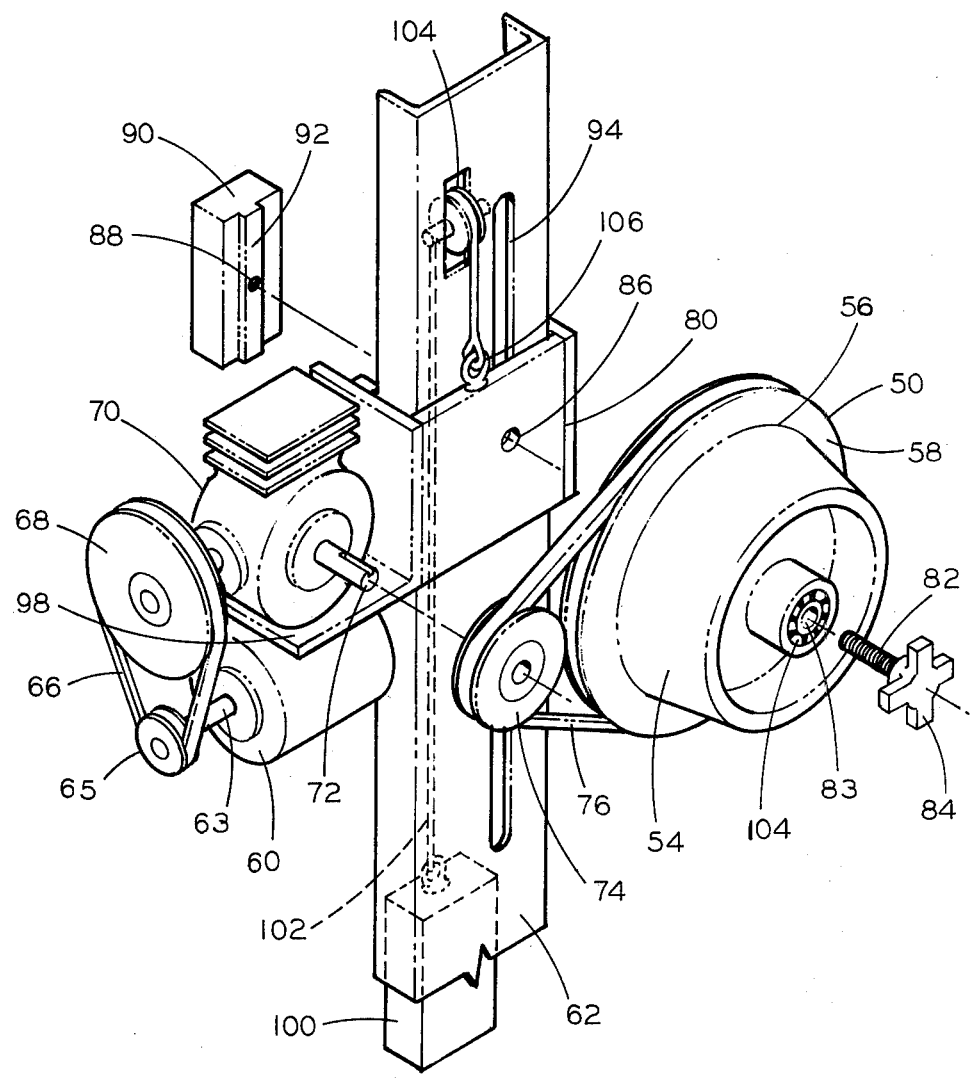
FIG. 7 is an isometric detail view of the upper portion of the apparatus utilized for clamping and driving the blade endlessly during grinding operation.
Figure 8:
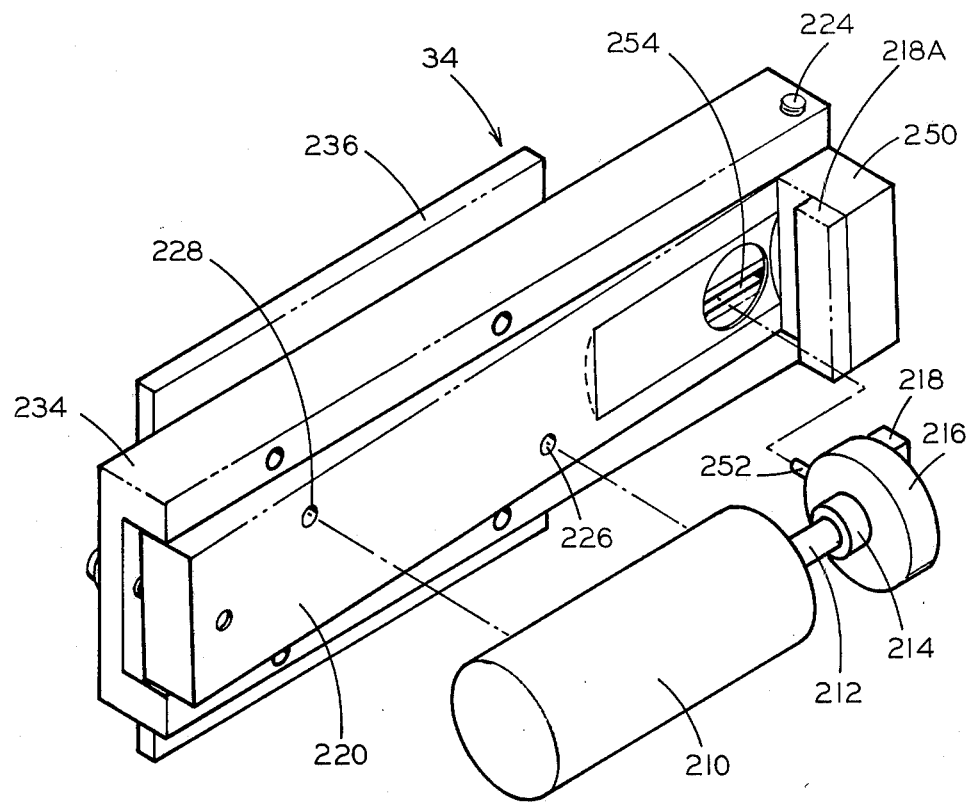
FIG. 8 is an isometric view illustrating the clamping means for the blade which holds the blade in a sliding grip at a preferred location relative to the wheel during the wheel grinding.
Figure 10:
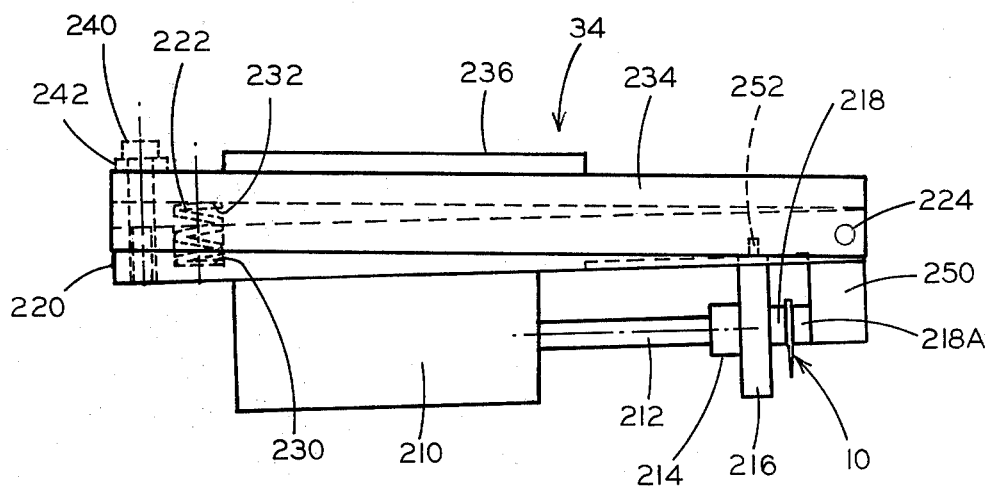
FIG. 10 is a detail view of the clamping means showing how adjustments are effected to locate the blade at a preferred angular position relative to the grinding wheel to produce the given blade grinding.
Figure 9:
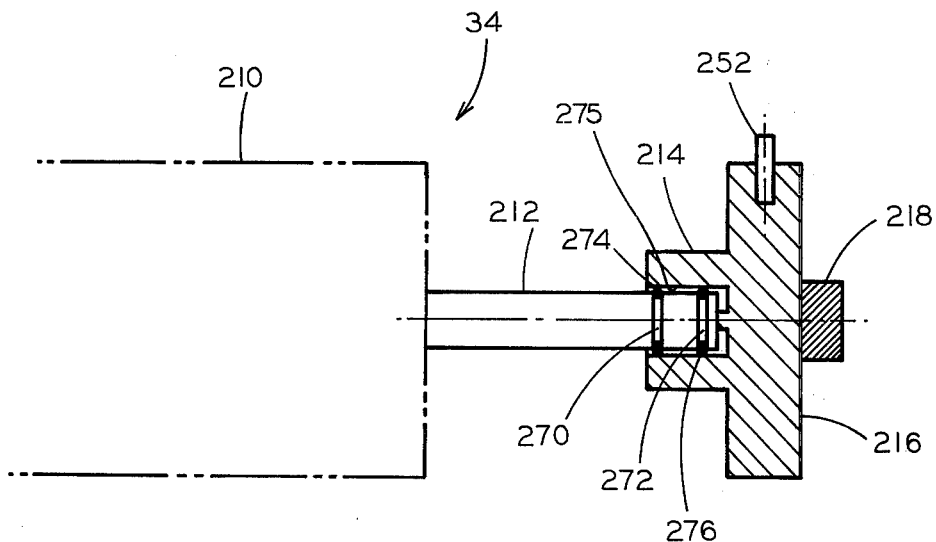
FIG. 9 is a detail sectional view illustrating how the clamping means provides universal movement at one of the clamping members to compensate for variations in thickness of the blade.

The grinding apparatus designated generally by reference numeral 31, is made up of the following subassemblies — the blade tensioning and rotating subassembly which is shown in FIGS. 3,4,5,6, and 7; the blade clamping means 34 shown in FIGS. 8,9, and 10, used for holding the blade during the grinding operation; the grinding wheels 36 and associated actuating adjusting means which are shown at the upper part of FIG. 6, and, finally, the controls which determine the duration of operation, the overriding of operation and the like, designated generally by reference numeral 40 and indicated in FIGS. 12,13.

These various subassemblies will next be considered under the appropriate heading and then the manner in which they operate together will become apparent from the description headed, "OPERATION".

BLADE TENSIONING AND DRIVING SUBASSEMBLY

Referring now to FIGS. 3-7, the blade 10 is passed over two wheels, an upper wheel 50 and a lower wheel 52. The two wheels have frustoconical bearing surfaces 54 upon which the blade 10 directly engages, and which cause the blade to move toward the larger diameter end 56 where there is a retaining flange 58. The blade moves endlessly between these two wheels 50,52. The upper wheel 50 is driven by a motor 60 (FIG. 7), thus causing the blade 10 to move endlessly between the upper wheel 50 and lower wheel 52. The two wheels are adjustable relatively to each other in a vertical sense to accommodate for different length blades.

The two wheels are mounted on a vertical stanchion 62 which is held in place by means of support legs 64 which are engaged on a foundation 66, the legs 64 being adjustable to insure true verticality of the stanchion 62. Stanchion 62 at its upper end receives the drive motor 60 with an output shaft 63, pulley 65, drive belt 66 connecting with pulley 68, and thence through gear reduction 70 to a power takeoff shaft 72 connecting with pulley 74 which drives upper wheel 50 through belt 76. Upper wheel 50 and associated drive mechanism is held by a brace 80 on stanchion 62 through a bolt 82 passing through bearing sleeve 83, bolt 82 being turned manually through a handle 84 and passing through opening 86 and into internally threaded opening 88 in clamping element 90. The clamping element 90 includes a rectangular boss 92 which fits slideably within slot 94 of the stanchion to insure rectilinear movement of the wheel 50, motor 60 and other of the structure which is mounted to brace 80 through a flange 98 which is welded or otherwise secured to brace 80. The entirety of the described structure is counterbalanced by a weight 100, which has a cable 102 passing over a pulley wheel 104 and secured at 106 to 80 thereby counterbalancing the weight of the wheel 50, motor 60, and associated actuating mechanism, so that when clamping bolt 82 is loosened, the wheel 50, motor 60, and associated actuator mechanism for the wheel can be adjusted upwardly or downwardly, sliding the boss 92 within the track 94 until the correct vertical position of the wheel 50 in a gross sense is established relative to the lower wheel 52 for a given length band. Once the two positions for the wheels are adjusted within an inch or two of each other for a given size band, the bolt 82 is screwed into the opening 88 and the described assembly is then held clamped between bolt 82 and clamping element 90 at the upper end of the stanchion 62.

At the lower end of the stanchion, wheel 52 is mounted on bearings 104 and a bearing sleeve 106 the same as the upper wheel is mounted on bearings 104 and a similarly associated bearing sleeve 83. The bearing sleeve 106 is clamped by bolt 108 having a grippable head 110 by threading into the internally threaded opening 112 of a mounting cylinder 115 which is transversely received on mounting plate 114 pivoted on a pivot bolt 116. The pivotal movement is effected by a lever 118 bolted to plate 114 by means of bolts 120 and the lever 118 is operated by air cylinder 122 which is carried on a pedestal 124 and has a plunger 126 acting against end 128 of lever 118 causing pivoting of both the lever 118 and plate 114 about 116, thereby raising or lowering the wheel 52 which is carried on shaft cylinder 115. The entire assembly, including the wheel 52, mounting structure, air cylinder 122 and guide plate 132, slideably fits over the lower end 134 of stanchion 62 and is carried on a chain 142 (FIG. 5) which is located at the rear of the assembly, the chain being supported at its upper end 144 in an opening of the stanchion 62. A gear wheel 140 acts as a sprocket movable within the openings between the links of the chain 142 causing the entire assembly to move up and down as dictated by turning of the wheel 146 having a shaft 148, a ratchet wheel 150, and pawl 152. The wheel 150 raises or lowers the wheel 52 assembly relative to the chain 142 and is then locked in place by means of the pawl 152. Regardless of positioning of the wheel 52 assembly by the chain, the lift cylinder 122 is able to raise the wheel 52 independently, as previously described through the lever 118 pivoting the wheel 52 upwardly about 116. Thus, when a blade or series of blades of a given configuration are to be ground, upper wheel 50 is first adjusted and clamped as before described, lower wheel 52 can be similarly adjusted and in a finer sense by the wheel 146, and then the wheel 52 is raised slightly by the air cylinder 122, the blade hoop is slipped over conical surfaces 54 at the upper wheel 50 and lower wheel 52, the air cylinder 122 is again operated to rotate the lower wheel 52 downwardly about 116 and the blade is then tensioned by the weight of the lower wheel 52 and any weight which is added to the lower wheel 52 to cause the blade to be under a preferred amount of tension. As previously described, the blade is flexible and the blade tension and powered rotation of the upper wheel 50, driven by the motor 60, rotates the lower wheel 52 in unison with the upper wheel 50 by the frictional grip of the blade as it passes over 54. The blade 10 thus moves endlessly between the wheels 50,52.

BLADE CLAMPING AND POSITIONING MEANS

Before the blade can be ground in a manner producing the shank section 14, it must, of course, be held relative to the grinding wheel, so that it will not spring back under the normal force of the grinding wheel bearing against the blade. The particular configuration of shank, that is, its depth, degree of cross sectional reduction and any inclination to the sides if desired, is all a function of how the blade is held relatively to the grinding wheel. These clamping, guiding, and adjusting means will next be described.

Referring to FIGS. 8,9,10, and 11, there is a blade clamping means which slideably grips the blade and holds it against movement during the time the grinding operation is effected. As shown in FIG. 8, there is illustrated an air cylinder 210, an air actuated piston (not shown), a piston rod 212 with a sleeve 214, clamping disc 216 and clamping block 218 of silicon carbide. The air cylinder 210 is mounted on an arm 220 which is biased by a spring 222 about pivot 224, cylinder 210 being rigidly held on the arm through mounting openings 226,228. The spring is compressed between a pocket 230 of arm 220 and a second pocket 232 of mounting bracket 234 which is mounted to the stanchion 62 through an intermediate plate 236. An adjusting bolt 240 which has a threaded connection 242 with arm 220 and a nut 242 threadedly mounted on bolt 240, is turned down, or backed off, to permit the spring 222 to adjust the angular position of arm 220 about 224, moving with it the air cylinder 210 mounted thereon. As shown in FIG. 10, the blade 10 is clamped between clamping block 218 and opposed clamping block 218A which is mounted on transverse arm 250 also carried by the arm 220. The two clamping blocks 218 and 218A slideably grip the blade 10 therebetween and with a force which is determined by the air cylinder 210 biasing 218 toward 218A, and thus yieldably and frictionally clamping blade 10 therebetween. 218 is constrained to move rectilinearly by means of a pin (FIG. 8) 252 which fits into a track 254.

The angularity of the blade 10 relative to the grinding wheel is determined by nut 242 which permits the spring 222 to angularly position the clamping blocks 218 and 218A as they are pivoted about pivot 224, and thereby determining the inclination of the blade 10 at the time it is presented to the grinding wheel. The frictional blocks 218,218A which grip and frictionally maintain appropriate position at the opposite sides of 30,32 of blade 10 are wear-resistant material, and while they normally hold the position of the blade at its preferred angular position, they do not greatly impede it as it moves therebetween, as their function is not to retain, but rather to simultaneously position and permit slidable blade movement. The blocks 218,218A may be hardened steel or impregnated material satisfactory for this purpose. Any wear of these surfaces is compensated for by the continuous yieldable backup of air pressure within the cylinder 210. Moreover, any variations in dimension of cross sectional thickness of the blade 10 is compensated by means of the universal connection between mounting for block 218 through disc 216 and the shaft 212.

Referring to FIG. 9, at the end of shaft 212 are two grooves 270 and 272 within which are mounted O-rings 274 and 276 which form a yieldable universal type movement between sleeve 214 which serves as the mounting for the disc 216 and gripping block 218. Socket opening 275 in sleeve 214 permits the slight wobbling, or universal type movement to accommodate for variations of thickness of base 12 of the blade 10 as it slides therebetween.

It will therefore be seen that the blade 10 while slideably held at the preferred angle and in a manner accommodating for the different blade thicknesses, will be useable for any given length of blade as well as from one blade to the next.

Adjustments are provided by backing off or tightening down the nut 242 and a further adjustment is provided by means of adjusting the entire mounting plate 236 (FIG. 8) relative to the stanchion 62 through movement of 236 on ways 280 (FIG. 6).

The depth of grind on the blade is determined by a further adjustment which will next be described in connection with FIGS. 6 and 11.

Figure 11:
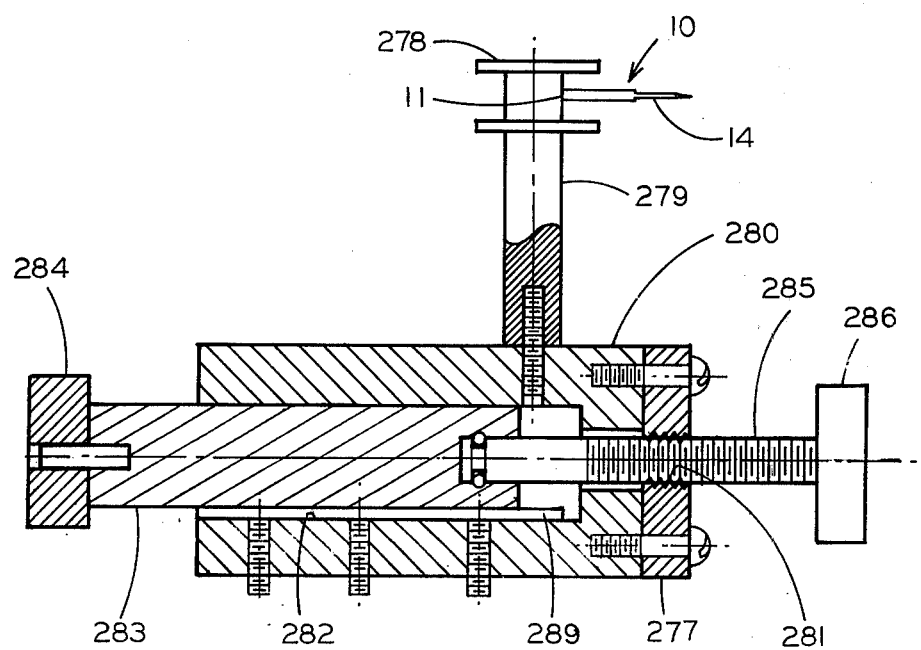
FIG. 11 is a section detail view showing how the blade is adjusted to determine the depth of grind, a further parameter in the grinding configuration for the blade.

Referring to FIGS. 6 and 11, the base edge 11 of the blade is backed by engagement with a flat faced spool 278 (FIG. 11) which is mounted on a shaft 279 carried by a cylinder 280 having an end plate 287 with an internally threaded opening 281 and a square cross section opening 282 fitting over a square cross section rod 283 held by a mounting block 284. Shims 287 hold the rod 283 and cylinder 280 tightly together. Cylinder 280 is thereby prevented from rotating but is caused to move back and forth by means of a threaded adjusting bolt 285 which is turned by a wheel 286. The adjusting wheel 286 and bolt 285 move the cylinder 280 back and forth, thus causing the spool 278 to adjust the position of the blade 10 relative to the grinding wheel, and this determines the length of the shank 14 (FIG. 2). When the adjuster wheel 286 advances the blade further toward the grinding wheel, it will increase the depth of grind and increase the longitudinal dimension of the shank 14; similarly, by counter-rotating 286, the blade 10 moves further away from the wheels to decrease the length of the shank 14. Note that this has nothing to do with the thickness of the shank (FIGS. 2A, 2B), but only the dimension and length of the shank relative to the scallops or beveled edges 24,26 and the base 12.

GRINDING WHEELS

Referring to FIGS. 4 and 6, there are two grinding wheels 310,312, having grinding faces consisting of cubic boron nitride. The trade name for these materials is "BORAZON", a product which is manufactured and supplied by the General Electric Company, and is fully described in trade literature of that company as well as the finished grinding wheel, which is manufactured by the Norton Abrasives Company, and is fully described, in turn, in its trade literature Form 3509 2P-PXM-4-74, which describes the truing and dressing of Norton Borazon wheels. Further trade literature and publication of these materials is contained in the Dec. 16, 1974 publication of the AFM/MN Trade Publication of General Electric. The method of using the Norton Borazon wheel is again fully described in a publication of Dec. 17, 1976 entitled, "NORTON GRINDING WHEEL DIVISION, WORCESTER, MASS., USA," the trade publication is identified as 2330 3PFXM 3-1-73NO printed in the United States.

The "Borazon" wheel consists of a flat annular grinding surface 314. The material has a Knoop hardness of approximately 4700, is relatively chemically inert and has almost no reactivity with the steel with which it grinds. The Knoop hardness, of kg/MM$^2$ is 4,700, as compared with 7,000 Knoop hardness of diamond. Thd cubic boron nitride is a solid oxide $B_2O_3$. The composition and method of manufacturing of this wheel does not per se form a part of the present invention. It should be noted, however, that when the Borazon wheel presents a flat, annular grinding surface to the blade, and approaches the blade tangentially, it sweeps over an arcuate surface, effecting the grinding, not linearly, but through a surface engagement. This increases the time of grinding engagement and provides a better control of the normal force and the degree of material removal without encountering excessive temperatures to temper or otherwise change the physical properties of the blade.

Borazon nitride has a hard, durable, wear-resistant surface which removes material from the blade first at side 30 and then at side 32 to form the shank 14 during the time the blade is held by the clamping means as previously described. A shank of the desired thickness, length, and taper that is desired is provided by the described adjustment. The Borazon wheel is rotated by associated motor 316 carried on mounting block 318 through bolt mounting 319 and pivoted at 320 so that the motor 316 and Borazon wheel 310 driven thereby, can be moved arcuately as indicated by the double arrow headed line 321 (FIG. 6) and then clamped by means of a set screw 322 which fastens through slot 324 and into a threaded opening of mounting member 328. Mounting member 328 is, in turn, adjustable laterally by means of a wheel 330 to adjust for wear of the grinding wheels 310,310. Thus, the motor 316 and grinding wheel 310 which are mounted on 318 through mounting bolts 319, can be adjusted angularly to effect an inclined or beveled surface of the shank 14. As shown in FIG. 6, the grinding wheels 310,312 are spaced vertically one with respect to the other and act against the opposite sides 30,32 of blade 10 (FIG. 2) so that stock removal is effected continuously to produce the desired dimension for the shank 14.

CONTROL MECHANISM

Referring next to FIGS. 12,13, there is illustrated a timer 410 which serves to time the period required for a complete grinding cycle. This will, of course, change with the composition and size of the bands to be ground. With a given power source having a positive terminal 412 and a negative terminal 414, conductors 416,418 lead through series switches 420,422 to drive the grinding wheels or "stone" motors 316,316 through conductors 416, switch 420, conductor 419, switch 422, conductor 432, 432A and 432B to stone motors 316,316; 430B 430A to 430, switch 422, conductor 421, conductor 416 to switch 420, conductor 416 to negative terminal 414.

In addition to the timer, the mechanism is operated through remote stop microswitches 434,436, a manual override 438, and a manual switch 440, which operates cylinder 122 during adding and removing bands.

The pulley motor 60 is operated through timer 410 and air valves 450,452 are electrically operated through the timer 410 and are used to energize the air cylinders 210,210 associated with the clamping means.

The air cylinder 122 (FIG. 6) which raises and lowers the lower wheel 52 to allow the band 10 to be put on and off, is operated manually by switch 440 which is also under the influence of the timer.

Referring next to FIG. 13, there is incoming air in line 510 with a pressure adjustment 512, pressure gauge 514, and a variable pressure gauge 516 connecting with line 518 and thence to a needle valve 520 and a manifold 522. From there, and through line 523, and operating through solenoid valve 450 and line 527 leading to air cylinder 122 is illustrated the means for raising and lowering through the lever 118 carrying the lower wheel 52 to put bands on and off of the machine at the commencement part of the operation. Left-hand and right-hand clamping air cylinders 210 are operated by air line 519 through manifold 522, line 521, solenoid valve 452, line 524, branch lines 526,528 to the left-hand and right-hand air cylinders 210.

In this way, the mechanism is controlled through an electrical timer, through a manual override, remote start and remote stop, and the entire operation of the mechanism which turns the grinding wheels, clamps the blade, starts up and stops the motor 60, is given a cycle of grinding, and thereafter terminates the grinding process.

As disclosed, the operation can either be continuous or semi-continuous; but if operating on a continuous basis, requires a blade first to be inserted, clamped, and the operation can then be commenced for a given grinding cycle at which time it is then stopped and a blade of the desired profile and overall configuration is produced, including the described base and shank of a given cross sectional thickness and depth together with the scalloped and beveled edges as described in FIGS. 1,2, and 3.

OPERATION

In operation, the upper and lower wheels 50,52 are first adjusted to be of the approximate length necessary for a given size band. When the operation starts, the air cylinder 122 is actuated to raise the lower wheel 52, the band is slipped over the conical surface of the upper wheel and the lower wheel and the air cylinder 122 is again operated to lower the wheel 52 to tension the blade between the upper and lower wheels on the frustoconical surface 54.

Once the blade is fitted between the upper and lower wheels and the lower wheel 52 is lowered, it is under sufficient tension that it will move endlessly between the two wheels 50,52 and will tend to move up the incline, i.e., toward the larger diameter end of the frustoconical surfaces and against the flanges 58.

The motor 60 is then commenced by operation of the timer 410 and the blade then commences to move endlessly. As the blade moves past the gripping blocks 218,218A, it is positioned at a given angularity and is backed against lateral movement (FIG. 10), at the time it is confronted by the grinding wheel 310, first at one side 30 and then at the other side 32, the grinding wheel effects stock removal from first one side and then the other side of the blade to produce the configuration illustrated in FIGS. 2A and 2B. When the blade is first inserted into the machine, it has a scalloped edge and a beveled edge, and the function of the machine and apparatus as previously described is to superimpose shank 14 which consists essentially of stock removal in the original thickness of the base 12 to that of the shank 14. Thus, the shank serves as the reduced thickness connection between the scalloped and beveled sections 24,26 with the cutting edge 28 and the base 12.

The adjustment of the blade according to angularity and backup is determined by the position of blocks 218 and 218A as determined by adjustment of the nut 242 which, as shown in FIG. 10, determines the angular position of the blade relative to the grinding wheel at the time of grinding. The further adjustment illustrated in FIG. 11 is that obtained by adjuster wheel 286, which, through the spool 278, determines how much of the blade is wiped by the flat annular surfaces of the grinding wheels. This, in turn, determines the length of the shank, i.e., the lateral distance between the scalloped edges 20 and the base 12. These adjustments have all been previously described and, once set, function to hold the blade at the preferred location and effect the desired profile notwithstanding any slight variations in cross sectional thickness of the blade throughout its length and, indeed, notwithstanding any dimensional changes from one blade to the next, since the adjustments are backed resiliently by the air cylinders and are yieldably clamped at their angular position by means of air cylinders 210.

When it is time to adjust the grinding wheels, they are moved by wheels 330 a desired amount toward or away from the blade support; the grinding wheel is removable for replacement by detachment from the power shaft 331 of the respective motors 316.

Angular positioning for the grinding wheels can be effected by swinging the motors 316 and grinding wheels 310,312 on levers 318 as shown by 320.

At any time during the operation of the device, the timer can be overridden by manual override switch 438 and the device can also be remotely started or stopped by means of switches 434,436.

Although the present invention has been illustrated and described in connection with a few selected example embodiments of the invention, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims, as equivalents of the invention.

What is claimed is:

1. A slicing blade comprising a band having a flexible base section and a cutting section integrally related thereto and consisting of a series of regularly constructed scallops forming a cutting edge with regularly spaced cutting peaks and intermediate cutting valleys, inclined side faces of said scallops which intersect at the cutting edge which extends continuously between successive crests and valleys, and a reduced cross section untapered shank interconnecting the inclined side faces and said base and of substantially constant cross section throughout the length of the blade and of narrower dimension than said base to provide a continuous relief for the material being sliced by said cutting edge and providing substantially frictionless movement of the blade through the material being cut.

2. A cutting blade in accordance with claim 1 wherein said cutting blade is in the form of a continuous flexible band of hard, wear-resistant steel.

3. The blade construction in accordance with claim 1 in which the said shank is formed substantially continuously throughout the length of the blade and is of a cross sectional thickness intermediate the base and the scalloped cutting edges of said base.

4. A slicing blade comprising a flexible band having a base section, and a cutting section integrally related with said base section, said cutting section comprising a continuous series of regularly constructed scallops, each having a cutting edge with regularly spaced cutting peaks and intermediate cutting valleys, inclined side faces of said scallops which intersect to form a cutting edge extending continuously between successive crests and valleys, and a reduced cross section shank integrally connecting the inclined side faces of said scallops and said base with two shouldered portions between the base section and opposite sides of said shank, said shank being proportioned of substantially constant narrower cross section than said base throughout the length of the blade to effect substantially frictionless movement of the blade through the material being cut.

5. A cutting blade in accordance with claim 4 in which said cutting blade is comprised of a construction material consisting of hard, wear-resistant steel.

6. A slicing blade in accordance with claim 4 in which said shank extends substantially continuously throughout the length of said blade and has a cross-sectional thickness intermediate the said base and said scalloped cutting edges.

7. A slicing blade in accordance with claim 4 in which the sides of said base are substantially parallel and terminate in a transverse, continuous flat surface.

8. A slicing blade in accordance with claim 4 in which successive honings of said inclined faces effect material removal from said reduced cross-section shank without essentially varying the substantially frictionless movement of the blade through the material being cut while the cutting surface of said blade is renewed.

* * * * *